J. C. WIGHTMAN.
Power Sheep-Shears.
No. 199,243. Patented Jan. 15, 1878.
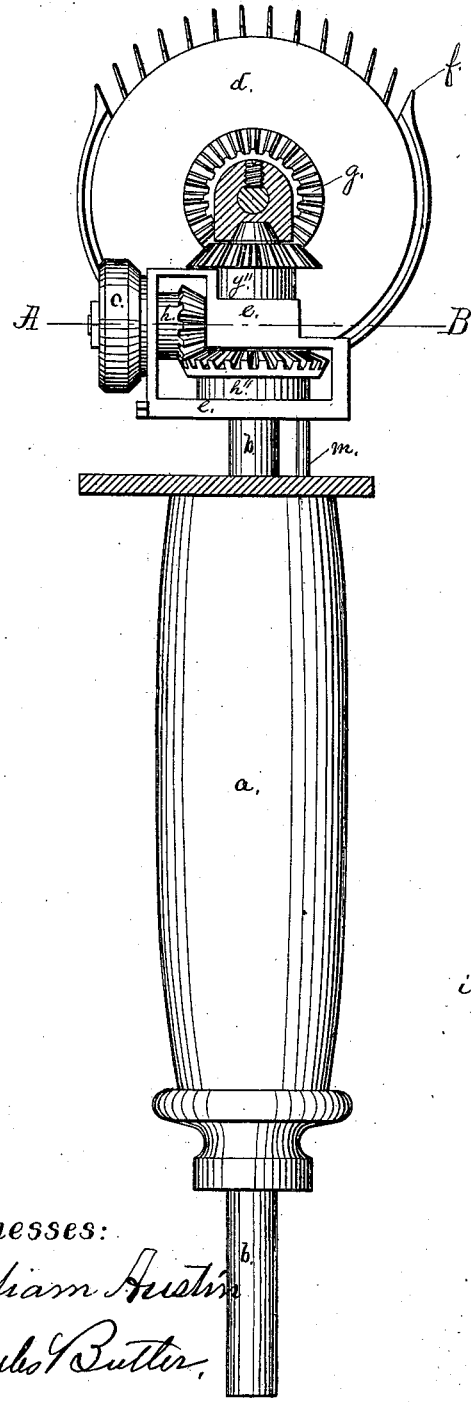
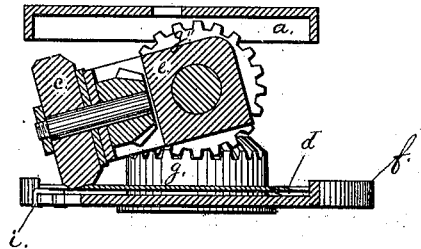
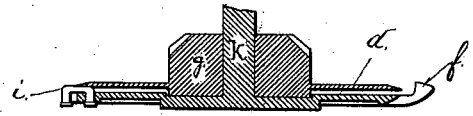
Witnesses:
William Austin
Charles Butler
Inventor:
Joseph C. Wightman

UNITED STATES PATENT OFFICE.

JOSEPH C. WIGHTMAN, OF BOSTON, MASSACHUSETTS.

IMPROVEMENT IN POWER SHEEP-SHEARS.

Specification forming part of Letters Patent No. 199,243, dated January 15, 1878; application filed May 25, 1877.

*To all whom it may concern:*

Be it known that I, JOSEPH C. WIGHTMAN, of Boston, county of Suffolk, and State of Massachusetts, have invented a new and useful Improvement in Power Sheep-Shears, which improvement is fully set forth in the following specification, reference being had to the accompanying drawings.

My invention relates to sharpening power sheep-shears while in operation, and is applicable to the revolving circular cutter described in my application for improvement in power sheep-shears allowed March 27, 1877.

It consists in applying certain devices to operate upon the cutter, by which a cutting-edge is maintained, or instantly obtained, at the will of the operator, and may be automatic or continuous in the action desired, or applied by the operator when needed during use in shearing.

In the accompanying drawing, in which similar letters of reference indicate like parts, Figure 1 is a plan view of the shears with the portion of the handle over the cutter and sharpener removed. Fig. 2 is a vertical section through the line A B of Fig. 1. Fig. 3 is a vertical section of the cutter and its driving-gear, together with the comb and edge-straightener, hereinafter described.

The shears and sharpening device are connected with any suitable motor through the driving-shaft $b$, which passes through the hollow handle $a$.

The shaft $b$ is provided, at and near its outer end, with two beveled-gear wheels, $g''$ and $h''$, and also carries, loosely attached to it, the frame $e$, carrying the grinding-wheel $c$ and bevel-gear wheel $h$.

The wheel $g''$ meshes with the wheel $g$, to which is firmly fixed the cutter $d$. The wheel $h''$ meshes with and operates the wheel $h$, to which is attached a grinding-wheel, $c$. This grinding-wheel may be made of any suitable material; but I prefer it of solid emery. It is brought in contact with the edge of cutter $d$, and released therefrom by means of the spring $m$.

To protect the gearing from being clogged by bits of wool, &c., it may be covered by a suitable hood, such as is often employed for similar purposes.

Projecting at right angles from the handle is the stem $k$, carrying upon its outer head, and formed concentrically with it, the comb $f$. At the rear portion, and upon the upper surface of the comb-plate, is the device $i$, which I term an "edge-straightener," formed of any suitable substance, preferably of hardened steel. Its attachment to the implement may be in any suitable way to bring it in contact with the cutter; but I prefer that just described. Its purpose is as follows: When the grinding-wheel is pressed upon the upper surface of the cutter-edge, it not only sharpens the latter, but tends to turn it downward from a horizontal plane; but this is obviated when the lower side of the cutter-edge passes in close contact over the edge-straightener $i$, and a keen cutting-edge is presented directly against the fleece.

The operation of the implement is obvious from its construction.

In using the shears, suitable power is to be applied to the shaft, producing a rapid rotary motion, by the connecting-gears, to the cutter or knife and the grinding-wheel simultaneously. Upon pressing the comb into the wool close to the skin of the sheep, and moving the whole implement forward, the wool will be sheared from the skin.

Any resistance to this cutting action, which indicates dullness of the cutter, can be instantly overcome by the operator forcing the grinding-wheel against the edge of the revolving cutter, as herein explained.

I claim—

1. An improved shearing device, consisting of a circular cutter, a grinding-wheel for sharpening said cutter, and a comb-plate, all attached to a handle, a mechanism for transmitting motion through said handle to use cutter, grinding-wheel, and comb-plate, substantially as described.

2. The combination of a comb-plate, a circular cutter, and an edge-straightener, substantially as described.

JOSEPH C. WIGHTMAN.

Witnesses:
WILLIAM AUSTIN,
CHARLES BUTLER.